April 24, 1951     H. A. TOULMIN, JR     2,549,864
CONTINUOUS PROCESS FOR MAKING SPONGE RUBBER
Filed June 12, 1948     3 Sheets-Sheet 1

INVENTOR
HARRY A. TOULMIN Jr.
By Toulmin & Toulmin
ATTORNEYS

April 24, 1951     H. A. TOULMIN, JR     2,549,864
CONTINUOUS PROCESS FOR MAKING SPONGE RUBBER Filed June 12, 1948     3 Sheets-Sheet 3

INVENTOR
HARRY A. TOULMIN Jr.
By Toulmin & Toulmin
ATTORNEYS

Patented Apr. 24, 1951

2,549,864

UNITED STATES PATENT OFFICE 2,549,864

CONTINUOUS PROCESS FOR MAKING SPONGE RUBBER

Harry A. Toulmin, Jr., Dayton, Ohio, assignor to The Commonwealth Engineering Company of Ohio, Dayton, Ohio, a corporation of Ohio Application June 12, 1948, Serial No. 32,574

5 Claims. (Cl. 260—723)

This invention deals with a method of making sponge rubber and an apparatus therefor.

The processes used heretofore for making sponge rubber require closed molds for the gasifying and vulcanizing steps. This was a great disadvantage because only limited quantities of sponge rubber could be produced at a time and the processes could be carried out only in a discontinuous manner.

It is an object of this invention to overcome these disadvantages encountered heretofore and to provide a process and an apparatus with which sponge rubber may be made in a continuous operation.

It is an object of this invention to make sponge rubber without the use of closed molds.

It is another object of this invention to make sponge rubber without the application of pressure.

It is another object of this invention to make sponge rubber from latex without the necessity of refrigeration.

It is still another object of this invention to provide a method of making sponge rubber from latex foam whereby foaming is not effected until after the latex is released and deposited for curing.

It is a further object of this invention to provide a method of making sponge rubber from latex foam which has a great stability.

It is thus another object of this invention to make sponge rubber in an extremely simple and inexpensive manner for which no skilled labor is required.

These and other objects are accomplished by impregnating rubber latex with nitrous oxide gas, allowing said gas to expand whereby a foam is formed, curing said foam into a sponge material and continuously replacing said cured sponge by a new supply of latex foam.

The invention will be more fully understood from the following description taken in connection with the accompanying drawings, in which Figure 1 is a front-elevational diagrammatic view of one embodiment of my invention;

Figure 1:
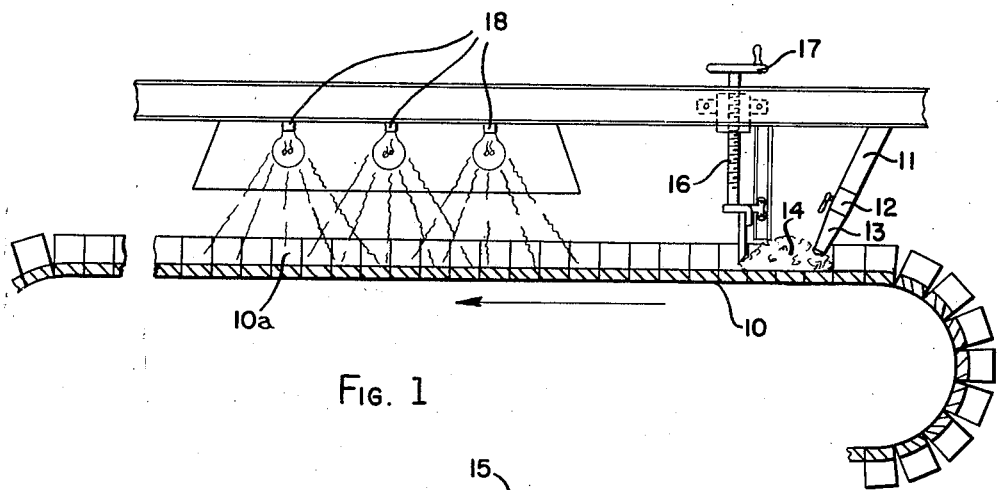
Figure 6:
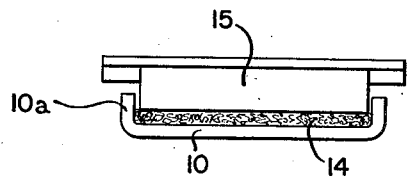
Figure 6 is a cross-sectional view taken along line 6—6 of Figure 2.
Figure 2:
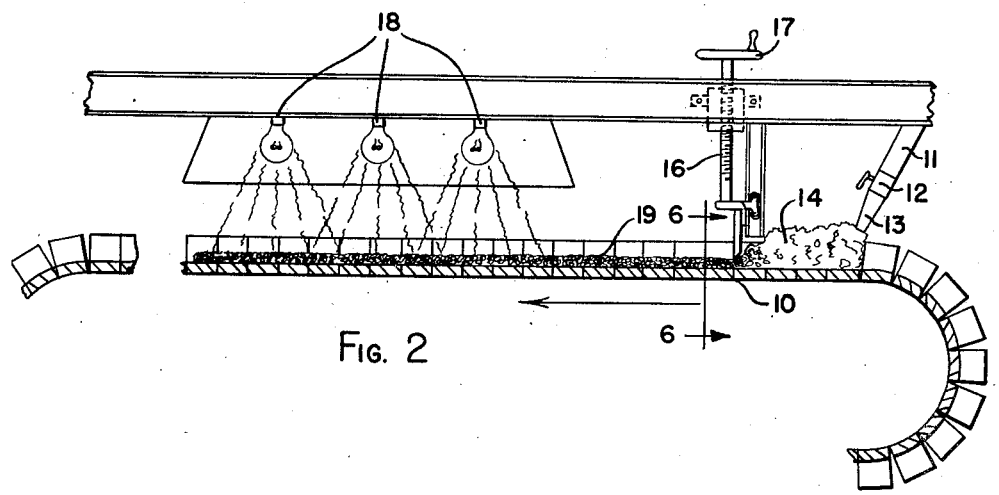
Figure 2 is a front-elevational diagrammatic view of the same apparatus, but during a later phase of the process.

Referring to the drawings in detail, and in particular to Figures 1, 2 and 6, the reference numeral 10 designates an endless belt with side walls 10a traveling in the direction of the arrow. At the right-hand side, above said belt, there is mounted a hose 11 having a valve 12 and a dispense nozzle 13. This hose is connected with a tank (not shown). A supply of latex foam flowing out of the nozzle 13 is designated with the numeral 14. A doctor blade 15 is arranged next to said nozzle; its distance from the belt 10 is adjustable by means of a screw 16 and a crank 17. The reference numeral 18 indicates a plurality of infra-red lamps. While Figure 1 shows the apparatus in the initial stage of operation, Figure 2 illustrates a later stage when a layer of rubber foam 19 has been deposited on almost the entire length of the belt 10, and part of it is just in the process of being cured.

The operation of the apparatus is as follows: Latex is impregnated with nitrous oxide gas in a container provided with the outlet 11. The latex foam 14 is then formed by release of said impregnated latex through the nozzle 13 and by expansion of the nitrous oxide gas therein; due to the movement of the belt and the action of the doctor blade 15, the latex is spread over the entire length of the belt 10 in uniform thickness. The thickness of the foamed layer may be adjusted either by controlling the speed of the belt, or by opening the valve 12 more or less, or by adjusting the distance of the doctor blade 15 from the belt, or by a combination of any of these three means. After the foamed layer has thus been spread and leveled out, it is brought into the sphere of action of the infra-red rays of the lamp 18 and continuously replaced by a new foam layer supply. There, curing of the foam takes place, and a sponge material is obtained in a continuous manner which has excellent qualities and a very uniform structure. The final product may then be immediately sent to the plant for further production, or else it may, for instance, be wound onto a reel or similar device for storage.

It is obvious that the processes, as well as the apparatus forming the subject of this invention, are extremely simple and inexpensive. There are no difficulties being encountered during operation, and the product obtained is of uniform quality.

Figure 3:
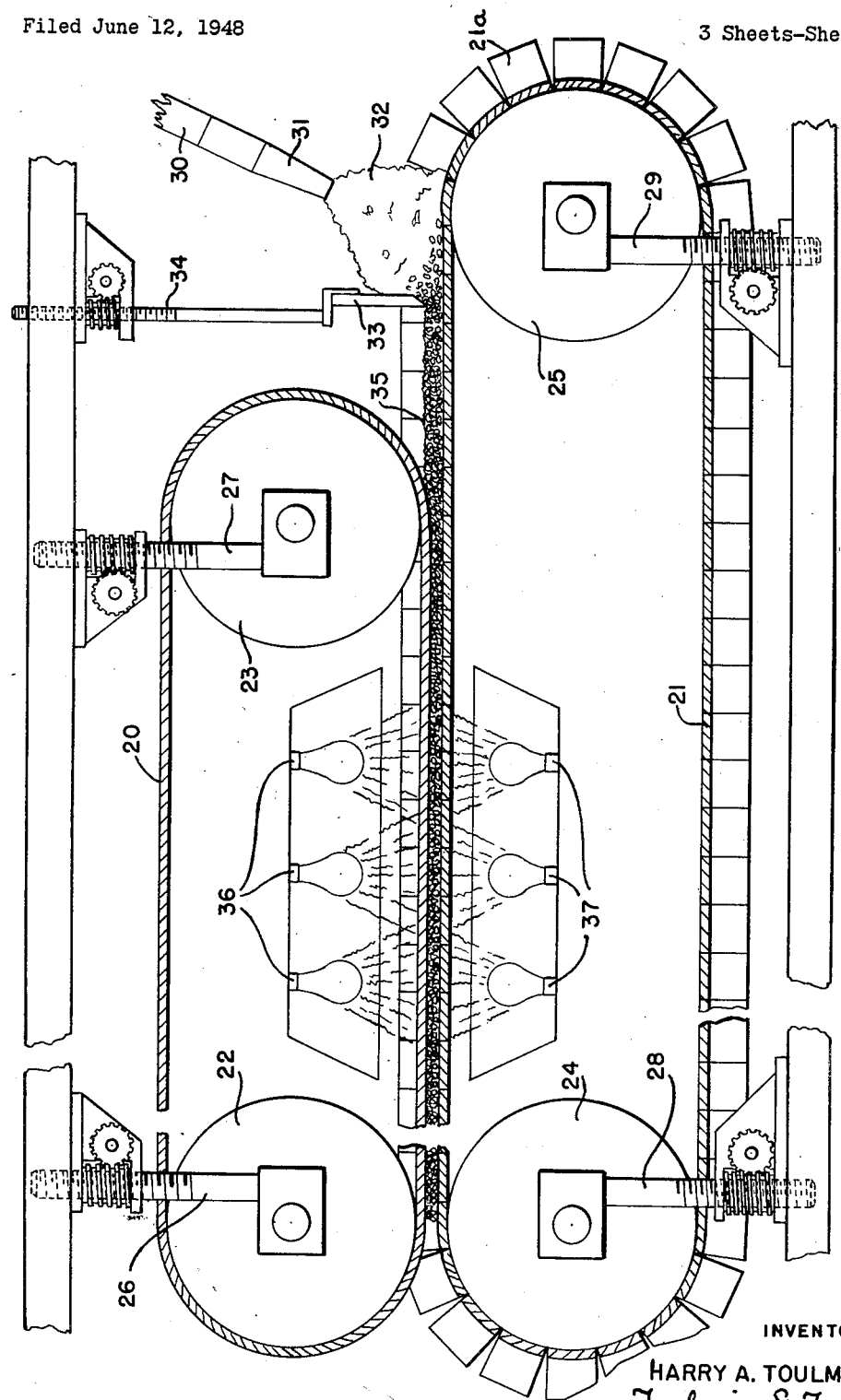
Figure 3 is a front-elevational diagrammatic view of another embodiment of my invention.

Figure 3 shows a modification of my invention. As in the instance of Figures 1 and 2, rubber latex foam 32 is dispensed from a hose 30 through a nozzle 31. A traveling belt 21 having side walls 21a receives said foam in the form of a layer 35; this layer is equalized first by a doctor blade 33 which is adjustable by means of a screw 34 and thereafter by means of a second traveling belt 20. The belts 20 and 21, which in the instance shown are made of steel, are driven by the rolls 22, 23 and 24, 25, respectively. The distance between both sets of rolls is adjustable by means of screws 26, 27, and 28, 29, respectively, whereby the thickness of the foam or sponge layer may be predetermined. In the embodiment shown in Figure 3, curing lamps are arranged on both sides of the belts, one set 36 being mounted above the rubber layer and inside the belt 20 and one set 37 being mounted in the inside of belt 21 and below the foam layer 35.

Figure 4:
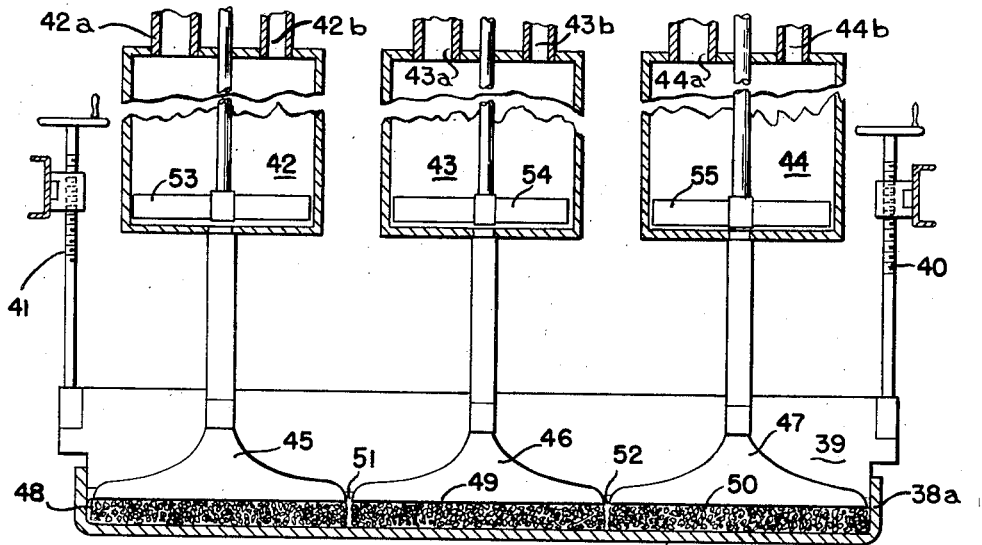
Figure 4 is a side-elevational diagrammatic view of still another embodiment of my invention.

Figure 4 shows a modification of the latex dispensing system. There, a plurality of tanks 42, 43 and 44 are arranged adjacent to each other above a receiving belt 38. Each of these tanks is provided with an inlet for the latex and one for the gas; they are designated with 42a, 43a, 44a and 42b, 43b, 44b, respectively. In this instance, a rubber sponge layer of considerable width is manufactured. Each tank has an outlet pipe which ends into a conic nozzle designated with 45, 46, and 47, respectively. The tanks are equipped with stirrers 53, 54, and 55 which not only agitate the latex-nitrous oxide mixture in the horizontal direction but which are also movable up and down so that a thorough agitation is also effected in the vertical direction. The foam layers deposited by the nozzles 45, 46, and 47 are designated with the numerals 48, 49, and 50, respectively. A doctor blade 39, adjustable by screws 40 and 41, is arranged behind said dispensing nozzles for the purpose of providing for uniform thickness of the sponge. The doctor blade, in the instance of Figure 4, performs another important function, namely it fills the separation lines or gaps 51 and 52 which are unavoidable between the foam strips 48 and 49, and between 49 and 50. The doctor blade takes excess foam from the thickness of the layers when leveling them and sweeps it into said crevices so that a piece of sponge is obtained which is free from any seams or separation lines and which does not show that it was actually made from three strips originally separated.

Figure 5:
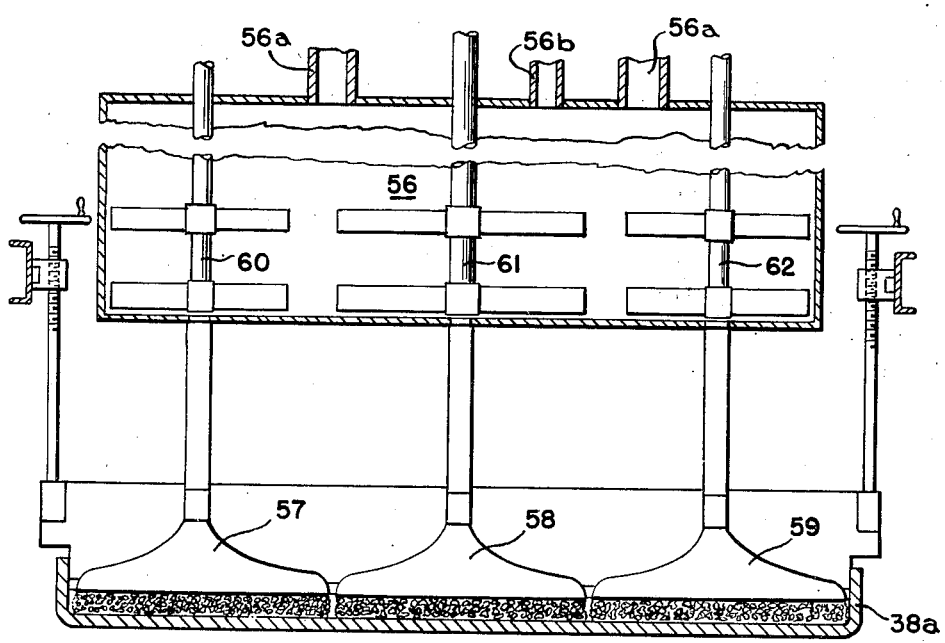
Figure 5 is a side-elevational diagrammatic view of still another embodiment of my invention.

Figure 5 is a view similar to that shown in Figure 4 with the exception of that not a plurality of tanks, but one large tank 56 is used. This tank is provided with a plurality of inlets 56a for the latex, with inlets 56b for the gas and with three dispensing nozzles 57, 58 and 59. The tank 56 has a plurality of compound stirrers 60, 61, and 62 which provide for a thorough agitation of the latex-gas mixture.

While all kinds of latices, natural as well as synthetic, may be used for the process of my invention, neoprene latex has been found particularly advantageous. However, butadiene copolymers, vinylidene latex and polyvinyl chloride latices have also been found most satisfactory.

The concentration of the latices is not critical; however, a concentration of roughly 50% has been found advantageous. It is also advisable to add auxiliary materials to the latices, for instance a sodium silicate solution in the quantity of approximately 2.25% for the purpose of desensitizing the latex and thus delay coagulation, and also for stabilizing the rubber foam. This addition of sodium silicate also makes refrigeration of the latices unnecessary. Other additional agents advantageous are vulcanizing agents, curing accelerators, and foam stabilizers. From 3 to 5% of high alpha-cellulose may also be added with advantage for strengthening the cell walls of the foam and thus prevent collapse. These materials, however, are known to those skilled in the art and their use is not being claimed per se.

It will be understood that instead of curing with infra-red light as shown by way of example in the drawings, vulcanization may also be carried out in a hot water bath or in a conventional curing oven. Likewise, instead of using a steel belt, receiving means for the foam that are made from other materials may also be used. For instance, the belt or receiving means may be a material which is to be permanently combined and used with the sponge rubber. Thus, for instance, a textile material or fabric may be continuously fed into the apparatus and integrally united with the sponge layer formed. Such combination materials are particularly valuable for instance for carpeting and other floor covering materials, for sound-proof wall coverings or the like. If a silicate containing latex has been used for the sponge rubber as pointed out above, the sponge has flame-resistant properties.

Another very valuable application of the silicate containing sponge rubber is a combination thereof with a glass-fibrous fabric base whereby a completely fire-proof material is obtained.

The prime advantage of the process and apparatus of this invention is that the latex is not being foamed prior to its release and deposit on the curing equipment.

The subject matter of this application is related to the following copending applications assigned to the assignee of this application:

Lewis, Ser. No. 10,137, filed Feb. 21, 1948; Lewis, Ser. No. 28,490, filed May 21, 1948; Shauffer, Ser. No. 32,717, filed June 12, 1948; and Toulmin et al.. Ser. No. 32,736, filed June 12, 1948.

It will be understood that while there have been described in this specification certain embodiments of my invention, it is not intended thereby to have the invention limited to the specific details given in view of the fact that my invention is susceptible to various modifications and changes which come within the spirit of the disclosure and the scope of the appended claims.

I claim:

1. In a continuous process for making sponge rubber, the steps of impregnating a mixture of a rubber latex and substantially 2.25% of sodium silicate with nitrous oxide gas, allowing said gas to expand whereby said latex is converted into a foam stable in the air and under curing conditions, curing said foam into a sponge material, and continuously replacing said cured sponge by a new supply of latex foam.

2. In a continuous process for making sponge rubber, the steps of impregnating a rubber latex containing a vulcanizing agent, a curing accelerator, a foam stabilizer, and substantially 2.25% sodium silicate with nitrous oxide gas, allowing said gas to expand whereby said latex is converted into a foam stable under curing conditions, curing said foam into a sponge material, and continuously replacing said cured sponge by a new supply of latex foam.

3. In a continuous process for making sponge rubber, the steps of impregnating a rubber latex containing substantially 2.25% sodium silicate with nitrous oxide gas, allowing said gas to expand whereby said latex is converted into a foam stable under curing conditions, adjusting the thickness of said foam so as to obtain a product of predetermined dimensions, curing said foam into a sponge material, and continuously replacing said cured sponge by a new supply of latex foam.

4. In a continuous process for making sponge rubber, the steps of impregnating a rubber latex containing substantially 2.25% sodium silicate with nitrous oxide gas, allowing said gas to expand whereby said latex is converted into a foam stable in the air and under curing conditions, adjusting the thickness of said foam so as to obtain a product of predetermined dimensions, curing said foam by means of infra-red heat into a sponge material, and continuously replacing said cured sponge by a new supply of latex foam.

5. In a continuous process for making a combination material having a layer of sponge rubber, the steps of impregnating a rubber latex containing substantially 2.25% sodium silicate with nitrous oxide gas, depositing said gas-impregnated latex onto a base material whereby said gas is permitted to expand and to convert said latex into a foam stable in the air and under curing conditions, adjusting and equalizing the thickness of said foam layer, curing said foam into a sponge material whereby an integral product is formed, and continuously replacing said combination material thus formed by new supplies of base material and latex foam.

HARRY A. TOULMIN, Jr.

REFERENCES CITED

The following references are of record in the file of this patent:

UNITED STATES PATENTS

| Number | Name | Date |
|---|---|---|
| 1,899,067 | Trumbull | Feb. 28, 1933 |
| 2,126,273 | Ogilby | Aug. 9, 1938 |
| 2,158,033 | McKinney | May 9, 1939 |
| 2,161,308 | Murphy, et al. | June 6, 1939 |
| 2,288,190 | Harrison | June 13, 1942 |
| 2,321,111 | Stamberger | June 8, 1943 |
| 2,336,944 | Madge, et al. | Dec. 14, 1943 |
| 2,441,235 | Blair, et al. | May 11, 1948 |